United States Patent [19]
Kurihara

[11] Patent Number: 5,289,683
[45] Date of Patent: Mar. 1, 1994

[54] METHOD FOR CONTROLLING SUPERCHARGING PRESSURE IN AN AUTOMOTIVE ENGINE

[75] Inventor: Masaru Kurihara, Tokyo, Japan
[73] Assignee: Fuji Jukogyo Kabushiki Kaisha, Tokyo, Japan
[21] Appl. No.: 86,616
[22] Filed: Jul. 1, 1993
[30] Foreign Application Priority Data
Jul. 23, 1992 [JP] Japan .................. 4-197202
[51] Int. Cl.⁵ ........................... F02B 37/12
[52] U.S. Cl. ........................... 60/602
[58] Field of Search ........... 60/600, 601, 602, 603; 123/564

[56] References Cited

U.S. PATENT DOCUMENTS

| | | |
|---|---|---|
| 4,646,522 | 3/1987 | Mamiya et al. .......... 60/602 |
| 4,697,421 | 10/1987 | Otobe et al. .......... 60/602 |
| 4,741,163 | 5/1988 | Hidaka et al. .......... 60/602 |
| 4,756,161 | 7/1988 | Hirabayashi .......... 60/602 |
| 5,031,406 | 7/1991 | Akiyama .......... 60/602 |

FOREIGN PATENT DOCUMENTS 2-115526  4/1990  Japan .

*Primary Examiner*—Michael Koczo
*Attorney, Agent, or Firm*—Martin A. Farber

[57] ABSTRACT

An automotive engine has a turbocharger, a wastegate valve for controlling flow rate of exhaust gas applied to a turbine of the turbocharger, and an actuator for controlling the wastegate valve. A standard supercharging pressure is determined dependent on characteristics of the wastegate valve, and a desired supercharging pressure is set in accordance with engine operating conditions. A difference between the desired supercharging pressure and the standard supercharging pressure is calculated, and a ratio of the difference to a detected actual supercharging pressure is calculated. From the calculated ratio, a control value applied to the actuator is calculated.

3 Claims, 9 Drawing Sheets

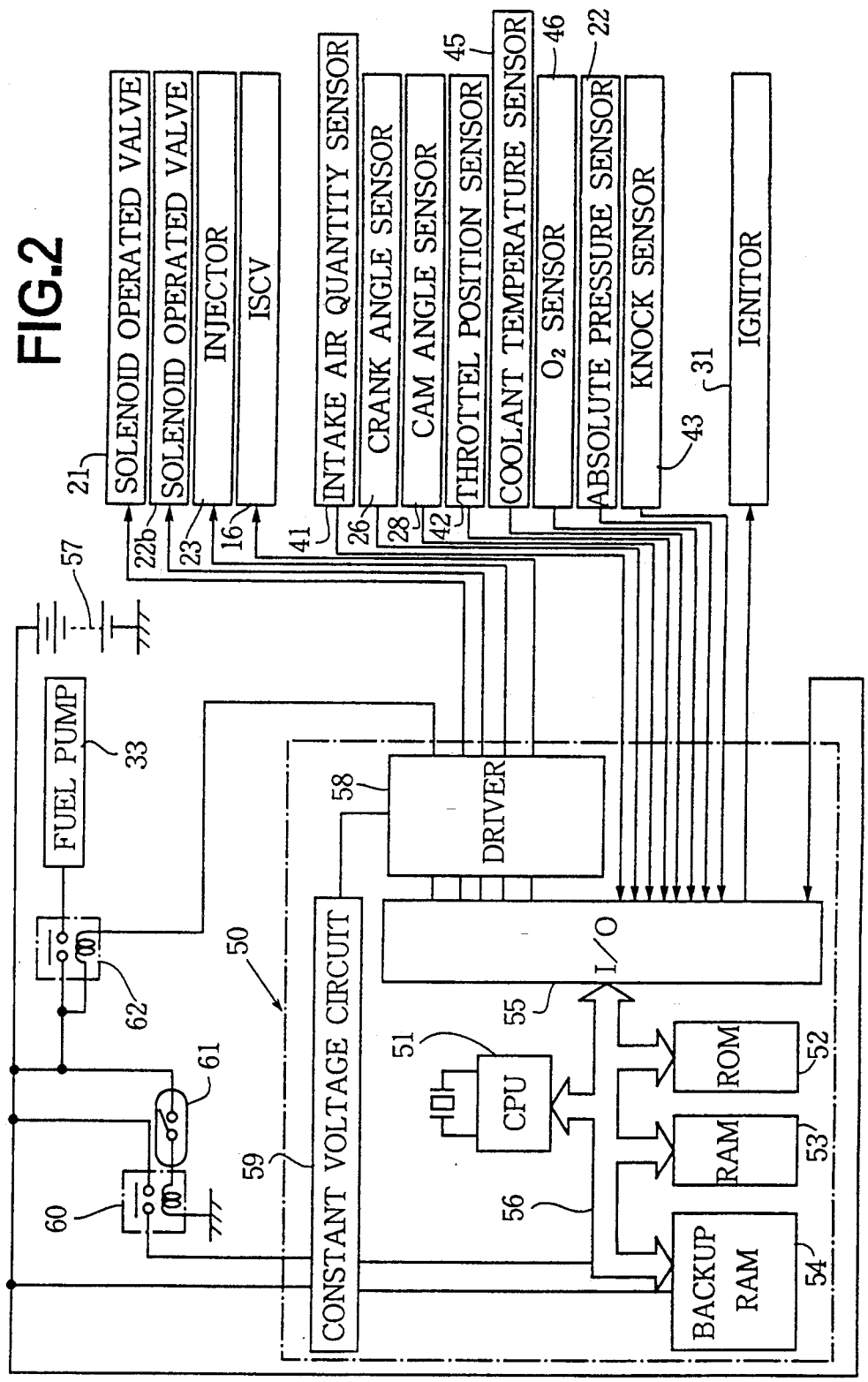

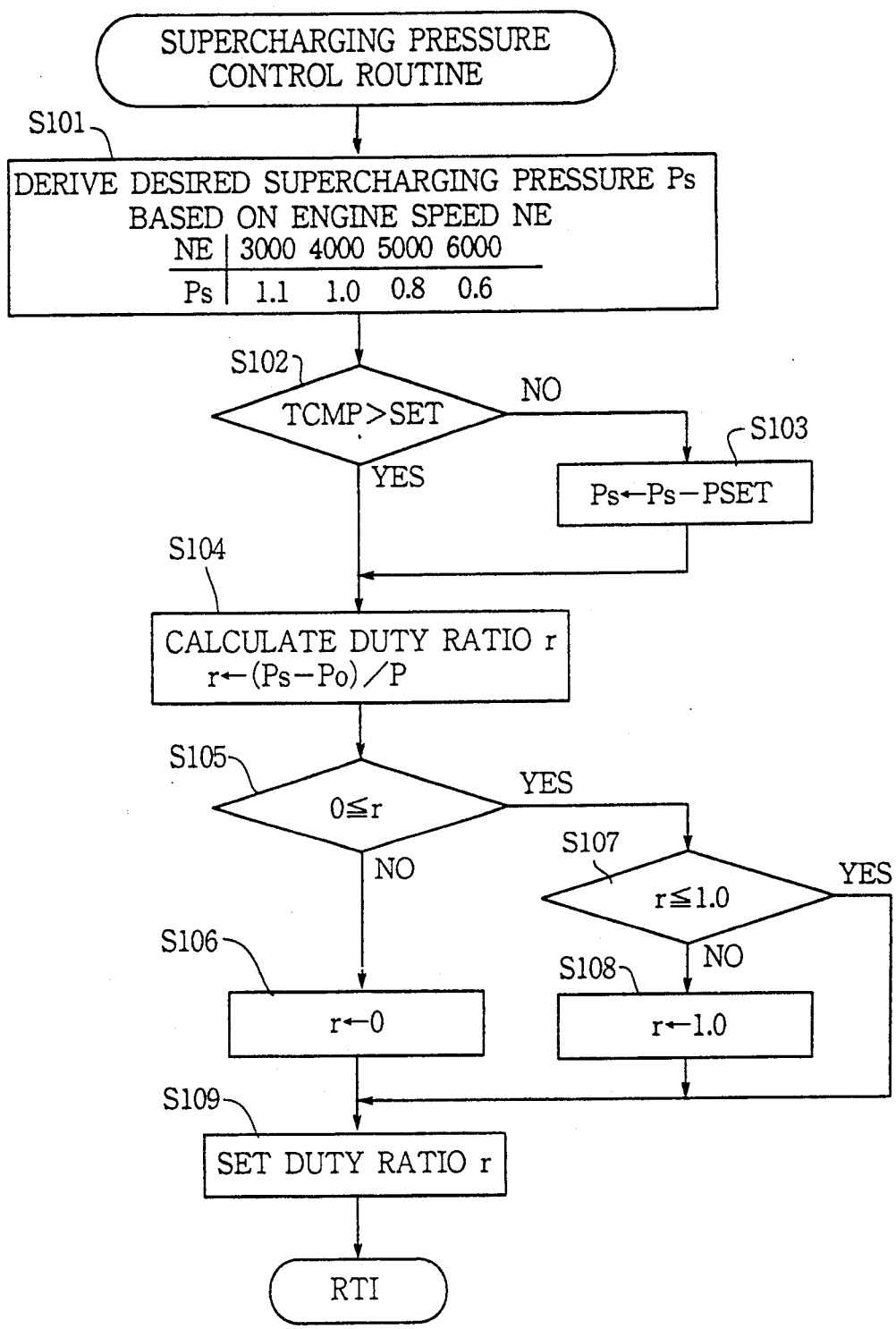

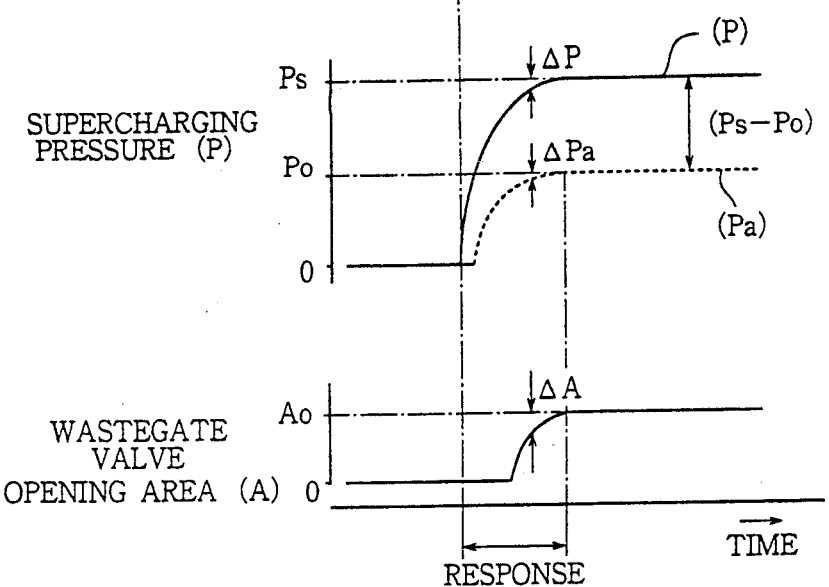
FIG. 4 a THROTTLE VALVE OPENING DEGREE (TH)
FIG. 4 b SUPERCHARGING PRESSURE (P)
FIG. 4 c WASTEGATE VALVE OPENING AREA (A)
FIG. 5
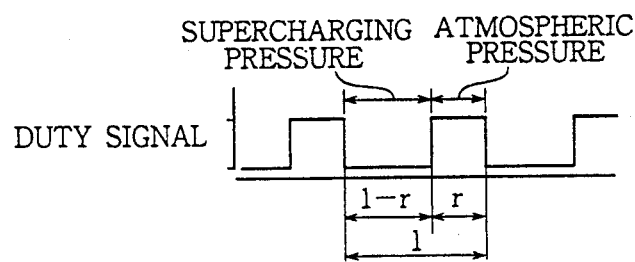

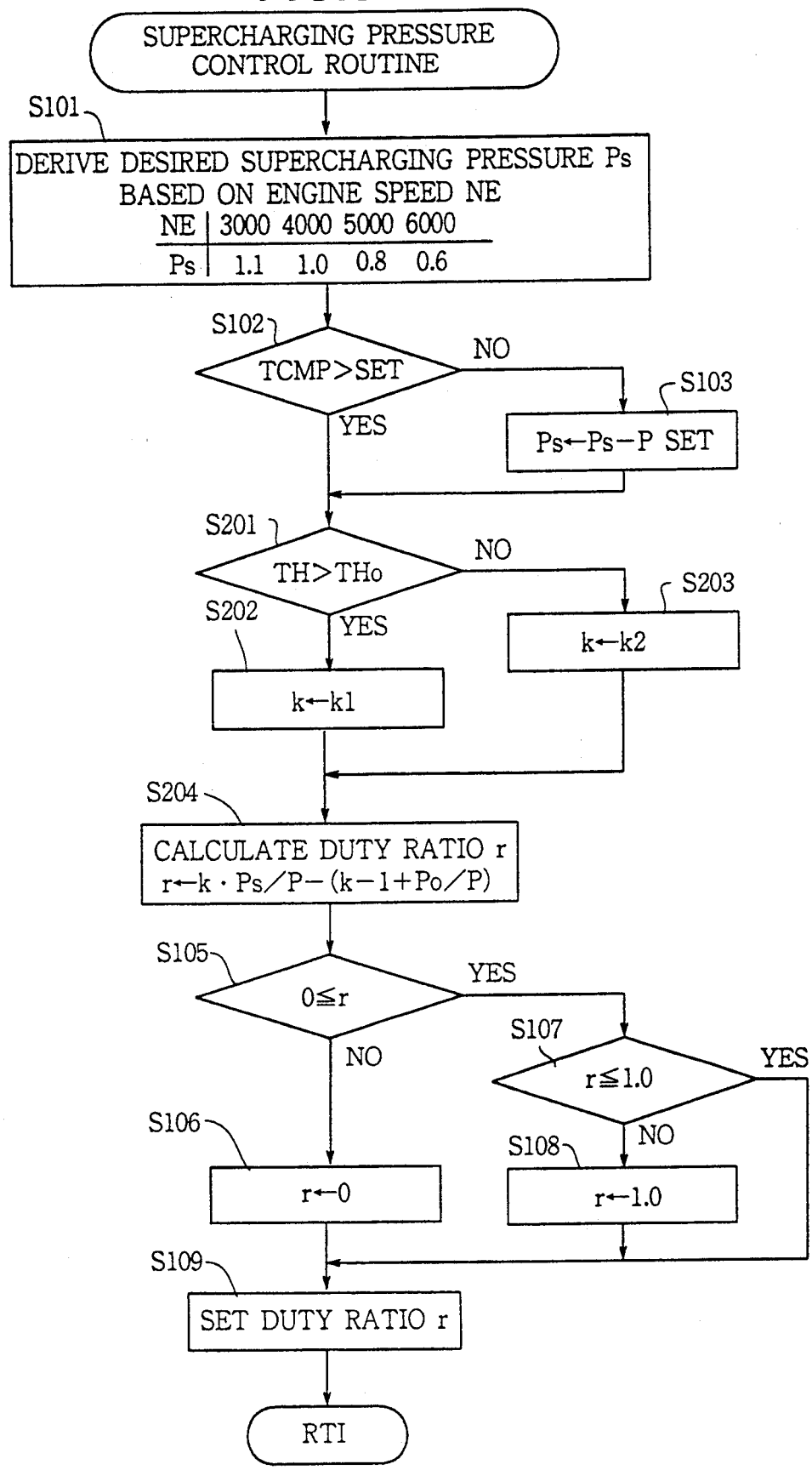

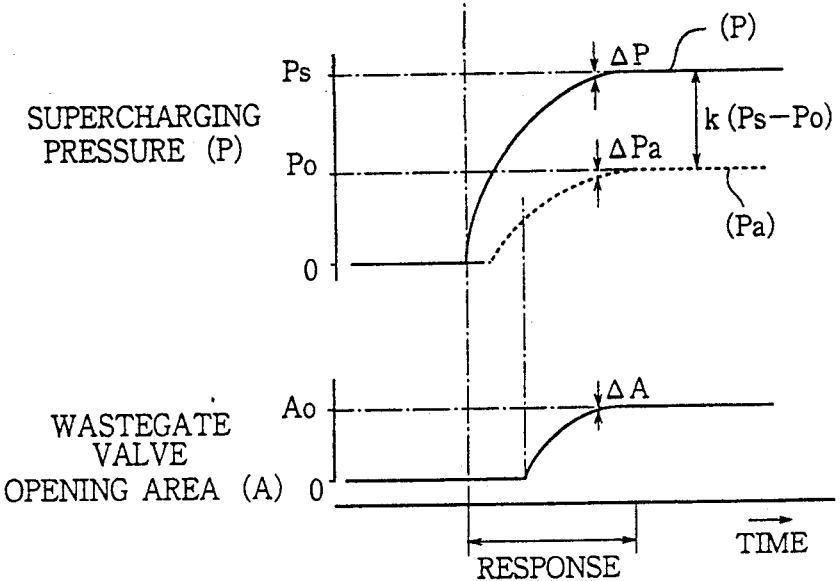
FIG.7 a THROTTLE VALVE OPENING DEGREE (TH)
FIG.7 b SUPERCHARGING PRESSURE (P)
FIG.7 c WASTEGATE VALVE OPENING AREA (A)
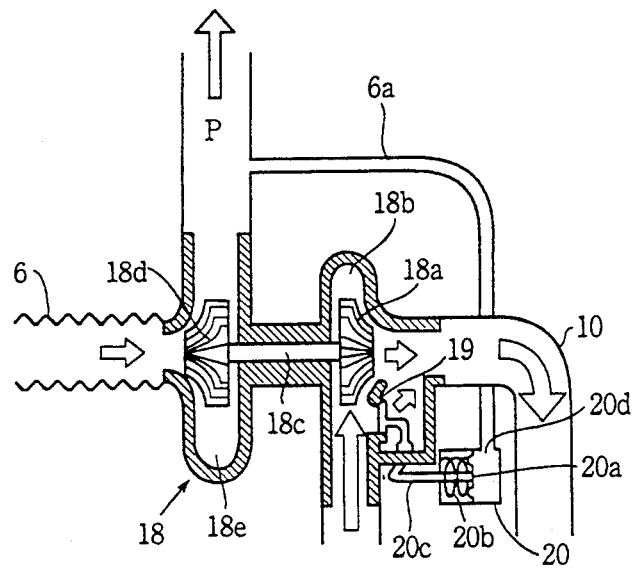
FIG.8

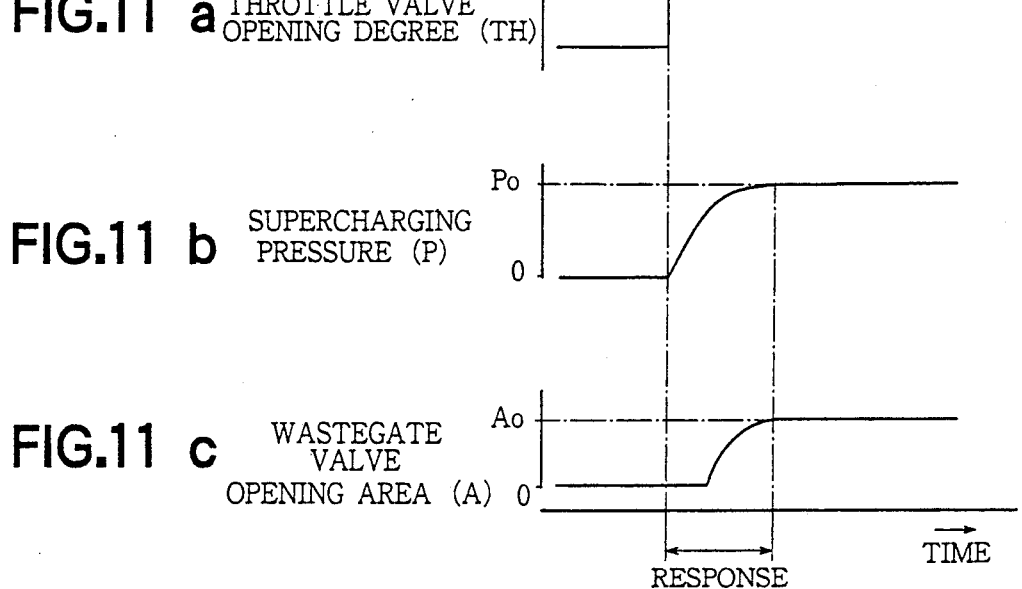

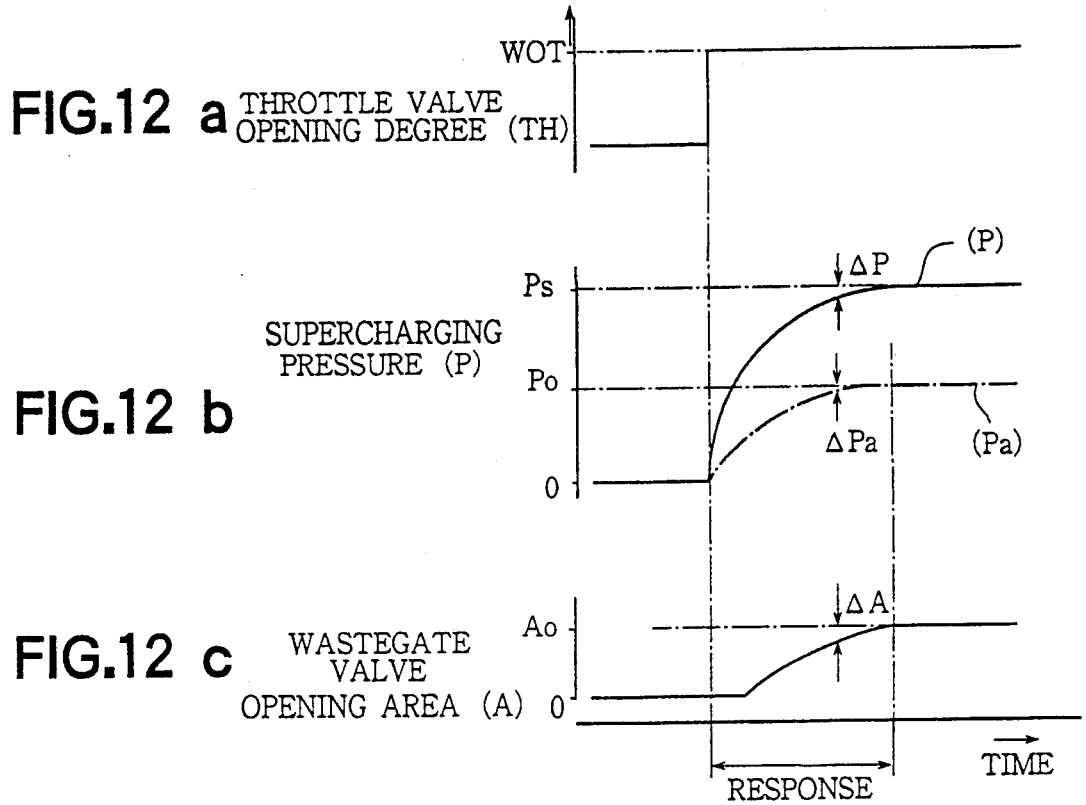
FIG. 12 a THROTTLE VALVE OPENING DEGREE (TH)
FIG. 12 b SUPERCHARGING PRESSURE (P)
FIG. 12 c WASTEGATE VALVE OPENING AREA (A)
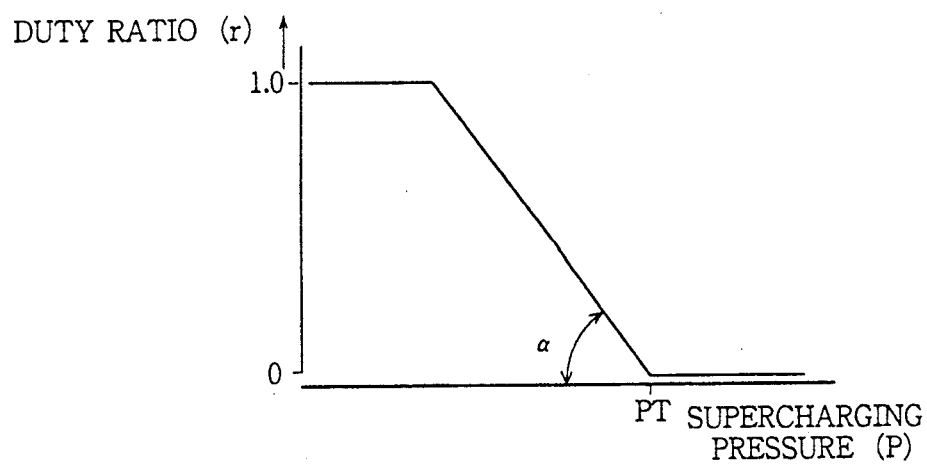
FIG. 13

METHOD FOR CONTROLLING SUPERCHARGING PRESSURE IN AN AUTOMOTIVE ENGINE

BACKGROUND OF THE INVENTION

The present invention relates to a method for controlling supercharging pressure in an automotive engine with a turbocharger, and more particularly to a method for controlling the supercharging pressure in dependency on engine operating conditions. The various types of the turbocharger are developed and practically used at present. The supercharging pressure is controlled by a control system which is designed in accordance with the various types of turbochargers.

FIG. 8 shows the turbocharger in the automotive engine having a wastegate valve with an actuator for actuating thereof.

A reference numeral 18 generally designates the turbocharger. The turbocharger 18 includes a turbine 18a having a turbine wheel installed in a turbine chamber 18b communicated with an exhaust pipe 10 and a compressor 18d having an impeller installed in an impeller chamber 18e communicated with an intake pipe 6. An outlet port of the chamber 18e is communicated with a cylinder of the engine. The impeller of the compressor 18d is mounted on a turbine shaft 18c connected to the turbine wheel of the turbine 18a. When the turbine 18a is operated by exhaust gas energy from the engine through the exhaust pipe 10, the impeller is rotated by the turbine 18d for compressing the intake air. Thus, the compressed intake air is supplied to the engine cylinder.

A wastegate valve 19 is provided in an inlet port of the housing 18b and operated by a diaphragm actuator 20. Namely, the wastegate valve 19 is operatively connected to a rod 20c of the diaphragm actuator 20. The rod 20c is connected to a diaphragm 20a. The diaphragm 20a is urged by a spring 20b to close the wastegate valve 19 through the rod 19. A chamber 20d of the diaphragm actuator 20 is communicated with the intake pipe 6 through a passage 6a. An intake pressure P at the downstream of the compressor 18d is applied to the chamber 20d of the actuator 20 through the passage 6a as an actuator operating pressure Pa (in this state P=Pa). The diaphragm 20a is deflected in accordance with the balance of an actuator pressure Pa of the chamber 20d and the spring force of the spring 20b for operating the wastegate valve 19, so that an opening area A of the wastegate valve 19 is set for controlling the pressure P to a standard supercharging pressure Po. The standard supercharging pressure Po is determined based on a force of the spring 20b.

In the control system of the turbocharger 18, mechanical characteristics of the diaphragm 20a, the spring 20b and the wastegate valve 19 are set in order to stably control the pressure P to the standard pressure Po with a good response.

Namely, as shown in FIG. 9, if the pressure P rises by ΔP from the standard pressure Po, the inner pressure of the actuator 20 is accordingly increased to push the rod 20c against the spring 20b so as to increase the opening area A of the wastegate valve 19 by ΔA from a reference opening area Ao so that the speed of the turbine 18a is reduced. Thus, the pressure P is controlled to the standard pressure Po. This is represented by a following equation.

$$\Delta A = G \cdot \Delta P \quad (1)$$

G: constant.

Here, assuming that a mechanical response characteristic Go is an optimal value for the system, if G<Go, the response of the system reduces. If G>Go, the response is too sensitive, causing hunting in operation. Consequently, the mechanical characteristic G should be set to G=Go.

As a further example, there is a supercharging pressure control system disclosed in Japanese Patent Application Laid-open No. 2-115526. FIG. 10 shows the system. The system has a solenoid valve 21 for operating the actuator 20, and an intake pressure sensor 36 for detecting an actual intake pressure P. The solenoid valve 21 is provided around the compressor 18d. The valve 21 is communicated with the chamber 20d of the actuator 20 through a passage 21c. The intake pressure sensor 36 is provided in the intake pipe 6 downstream of the compressor 18d.

The solenoid valve 21 has a solenoid 21a and a valve body 21b. Upon energization of the solenoid 21a in response to a duty signal applied from an electronic control unit, the valve body 21b is moved to control the pressure applied to the chamber 20d of the actuator 20. Thus, the wastegate valve 19 is controlled so as to control the pressure P to a standard supercharging pressure in the range of P≧Po.

The solenoid valve 21 operates to produce an actuator pressure Pa by mixing the pressure P in the intake pipe downstream of the housing 18e and the atmospheric pressure in the intake pipe upstream of the housing 18e at a duty ratio r of the duty signal. The actuator pressure Pa is applied to the chamber 20d of the actuator 20.

If the actuator pressure Pa is represented at a ratio to the atmospheric pressure, $$Pa = (1-r) \cdot P \quad (2)$$

$$0 \leq r \leq 1.0$$

As is understood from FIG. 9, the actuator pressure Pa is a value approximate to the standard pressure Po. Therefore, in a steady state, the pressure P is represented as follows.

$$P = \{1/(1-r)\} \cdot Po \quad (3)$$

However, in a transient state, as shown in FIGS. 11a, 11b and 11c, if a throttle valve is quickly opened to a wide opening WOT and if the duty ratio r is fixed, ΔA is represented as follows.

$$\begin{aligned} \Delta A &= Go \cdot \Delta Pa \\ &= \{(1-r) \cdot Go\} \cdot \Delta P \end{aligned} \quad (4)$$

This means that the operation of the wastegate valve 19 delays with respect to the change of the supercharging pressure P due to the mechanical characteristics G. Namely there is a problem in response characteristics in the transient state. If the duty ratio r is fixed to 0.5, A is $$\begin{aligned} \Delta A &= (1-r) \cdot Go \cdot \Delta P \\ &= (1/2) \cdot Go \cdot \Delta P \end{aligned} \quad (5)$$

Accordingly, the wastegate valve further delays as shown in FIGS. 12a, 12b and 12c.

In order to improve the response characteristics of the wastegate valve, there is proposed a system employed with a theory of a proportional control. In the system, the duty ratio r is controlled in accordance with the pressure P detected by the pressure sensor 36 as shown in FIG. 13. The duty ratio r is represented as follows.

$$r = \alpha \cdot (PT - P) \quad (6)$$

Thus, the opening area A is $$A = \{1 - \alpha(PT - P)\} \cdot Go \cdot P$$

$$A + \Delta A = \{1 - \alpha(PT - P - \alpha P)\} \cdot Go \cdot (P + \Delta P)$$

$$\therefore \Delta A = \{1 - \alpha(PT - 2P - \Delta P)\} \cdot Go \cdot \Delta P \quad (7)$$

In the theory, the gain of the system varies in accordance with the α, PT and ΔP, so that the response and stability are deteriorated. Moreover, it is difficult to solve such a problem.

SUMMARY OF THE INVENTION

An object of the present invention is to provide a system which may control supercharging pressure of an engine to a desired pressure at high response characteristics, even if a desired supercharging pressure is changed, thereby providing a preferable driving characteristics.

The engine, to which the present invention is applied, has a turbocharger, a wastegate valve for controlling flow rate of exhaust gas applied to a turbine of the turbocharger, and an actuator for controlling the wastegate valve.

The present invention comprises the steps of, setting a standard supercharging pressure dependent on characteristics of the wastegate valve, setting a desired supercharging pressure in accordance with engine operating condition, and calculating a difference between the desired supercharging pressure and the standard supercharging pressure.

A ratio of the difference to a detected actual supercharging pressure is calculated, and a control value applied to the actuator based on a calculated ratio is calculated.

In accordance with the present invention, the response characteristic is controlled constant irrespective of the desired supercharging pressure, so that a preferable driveability is provided.

Furthermore, the supercharging pressure response characteristic is controlled by a coefficient regardless of the desired supercharging pressure, so that an excellent driveability is obtained.

The other objects and features of this invention will become understood from the following description with reference to the accompanying drawings.

BRIEF DESCRIPTION OF DRAWINGS

FIG. 2 is a schematic illustration of a control unit of the system;

FIG. 3 is a flowchart showing an operation of the system;

FIGS. 4a, 4b and 4c are graphs showing the relationship between supercharging pressure, actuator pressure, opening area of wastegate valve corresponding to throttle valve opening degree;

FIG. 5 is a waveform showing pulses of a duty signal;

FIG. 6 is a flowchart showing a second embodiment;

FIGS. 7a, 7b and 7c are graphs of the second embodiment;

FIG. 8 is a schematic illustration of a conventional turbocharger;

FIGS. 11a, 11b and 11c are graphs showing a characteristic of the conventional turbocharger of FIG. 10;

FIGS. 12a, 12b and 12c are graphs showing a characteristic of another example of the conventional one; and FIG. 13 is an illustration showing a relationship between duty ratio and supercharging pressure in a conventional system.

DETAILED DESCRIPTION OF THE PREFERRED EMBODIMENTS

Figure 1:
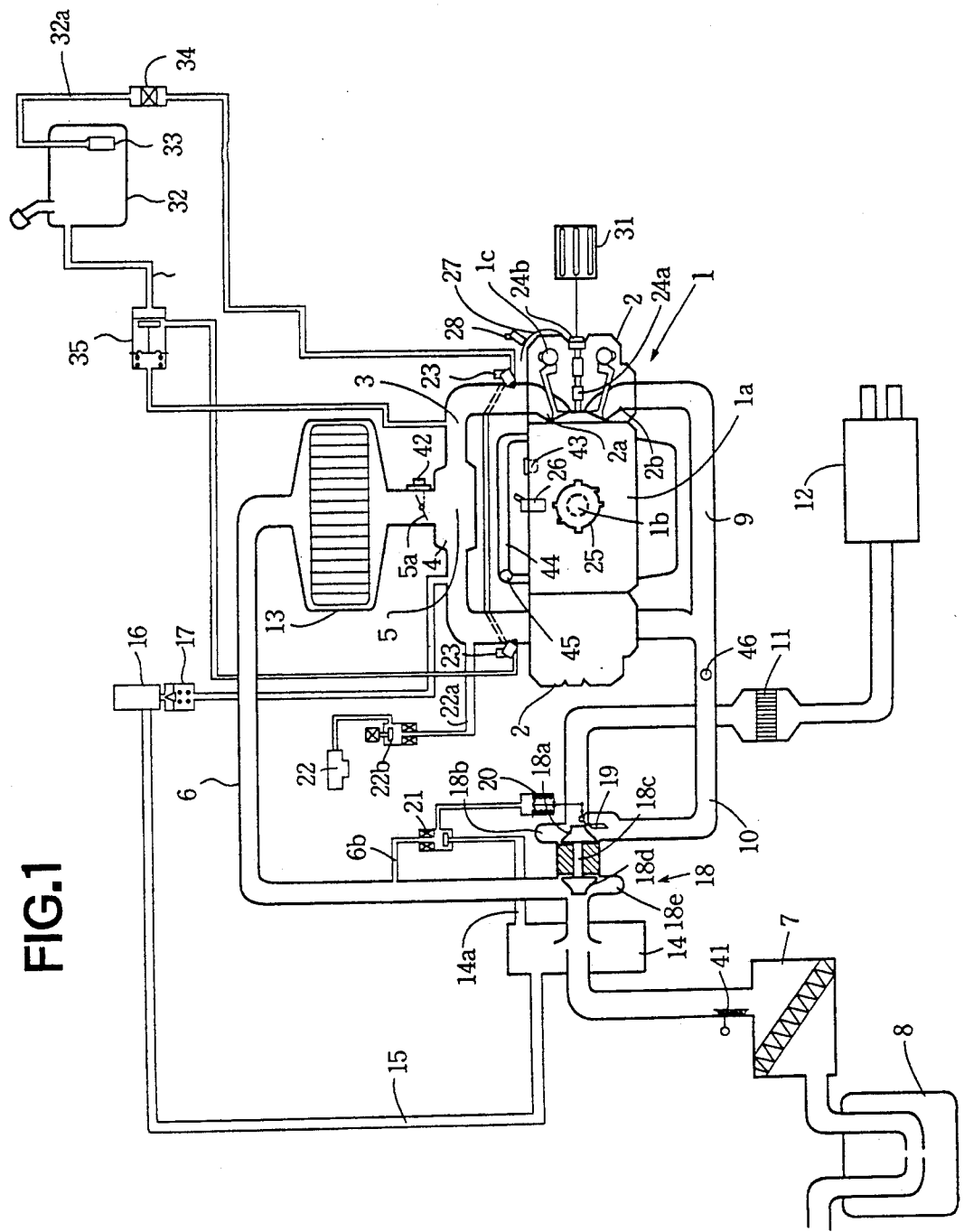
FIG. 1 is a schematic illustration of a system according to the present invention.
Figure 9:
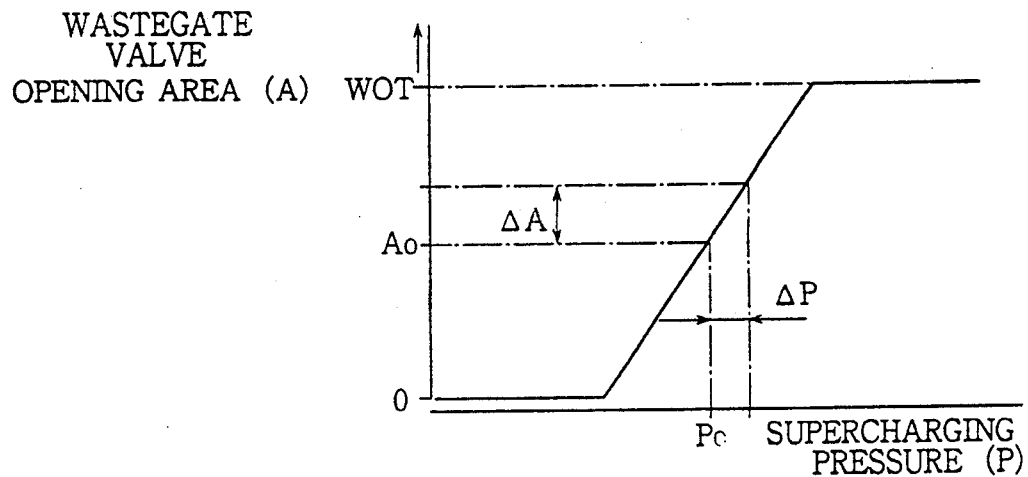
FIG. 9 is an illustration showing characteristics of supercharging pressure and opening area of a wastegate valve.
Figure 10:
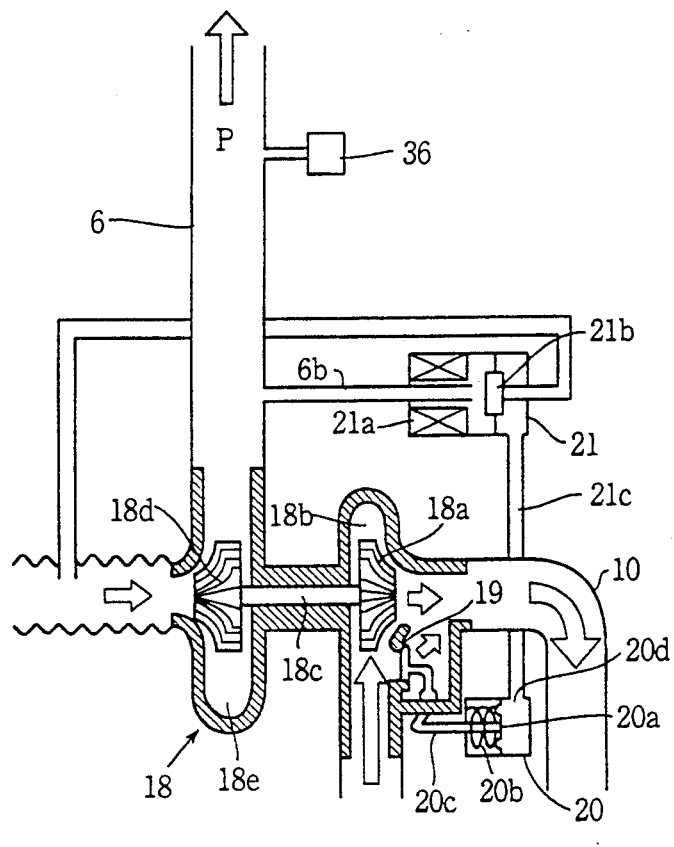
FIG. 10 is a schematic illustration of another conventional turbocharger.

Referring to FIG. 1 showing a horizontal opposite type four-cylinder engine 1 to which the present invention is applied, a cylinder head 2 of the engine 1 has intake ports 2a and exhaust ports 2b which are communicated with an intake manifold 3 and an exhaust manifold 9, respectively. A throttle chamber 5 having a throttle valve 5a is communicated with the intake manifold 3 through an air chamber 4. The throttle chamber 5 is communicated with an air cleaner 7 through an intake pipe 6. The air cleaner 7 is communicated with an air intake chamber 8 as an inlet port of intake air. In the intake pipe 6, an intercooler 13 is provided upstream of the throttle chamber 5, and a resonator chamber 14 is provided downstream of the air cleaner 7.

A bypass 15 having an idle speed control valve (ISCV) 16 is formed around the throttle valve 5a. The bypass 15 is communicated with the intake manifold 3 and the resonator chamber 14. A check valve 17 is provided in the bypass 15 downstream of the ISCV 16 to be opened when the intake pressure at the downstream side of the throttle valve 5a is negative.

The exhaust manifold 9 is communicated with an exhaust pipe 10 in which a catalytic converter 11 and a muffler 12 are mounted.

The turbocharger 18 provided in the exhaust pipe 10 has the same construction as that in the conventional system. Namely, the turbocharger 18 includes the turbine 18a having a turbine wheel housed in the housing 18b communicated with the exhaust pipe 10, the compressor 18d having an impeller housed in the housing 18e communicated with the resonator 14 through the intake pipe 6, and the turbine shaft 18c. The outlet port of the housing 18e is communicated with cylinders of an engine 1 through the throttle valve 5a, chamber 4 and the intake manifold 3.

The wastegate valve 19, diaphragm operated actuator 20, and a solenoid operated valve 21 are also the same as those of the conventional system.

The solenoid operated valve 21 is communicated with the resonator 14 through a passage 14a and the intake pipe 6 downstream of the compressor 18d through a passage 6b.

A bypass 22a having an absolute pressure sensor 22 is communicated with the intake manifold 3. A solenoid operated valve 22b is provided in the bypass 22a for selectively connecting the absolute pressure sensor 22 to the intake manifold 3 and the atmosphere. When the sensor 22 is connected to the intake manifold, the intake pressure is detected.

Fuel injectors 23 are mounted in the intake manifold 3 adjacent corresponding ports 2a. A spark plug 24a is located in each combustion chamber formed in the cylinder head 2. An ignitor 31 is connected to the spark plug 24a through a coil 24b.

The fuel in a fuel tank 32 is supplied to the fuel injector 23 by a fuel pump 33 provided in the tank 32. The fuel in the tank is supplied to the injectors 23 by the pump 33 through a fuel passage 32a having a filter 34 and returned to the tank 32 through a pressure regulator 35. The fuel pressure is regulated to a predetermined value by the pressure regulator 35.

An intake air quantity sensor 41 of a hot wire type air-flow meter is provided in the intake pipe 6 downstream of the air cleaner 7. A throttle position sensor 42 is provided for detecting an opening degree of the throttle valve 5a. In order to detect knocking, a knock sensor 43 is mounted on a body 1a of the engine 1 to detect oscillation of the engine 1. A coolant temperature sensor 45 is provided in a coolant jacket 44 of the engine 1 and an $O_2$-sensor 46 is provided in the exhaust pipe 10.

A crankshaft disk 25 is secured to a crankshaft 1b of the engine 1. A crank angle sensor 26 (magnetic pickup) is provided adjacent the crankshaft disk 25 for detecting crank angles. A camshaft disk 27 is secured to a camshaft 1c for detecting camshaft angles. A cam angle sensor 28 is provided adjacent the camshaft disk 27.

The crankshaft disk 25 has a plurality of projections disposed at predetermined crank angles. A rotating period of the engine 1 is calculated from an elapsed time between the projections. One of the projections represents a reference crank angle for determining an ignition timing and a fuel injection timing.

When the crankshaft disk 25 rotates, the crank angle sensor 26 detects positions of the projections and produces signals in a form of pulses.

The camshaft disk 27 is provided with a plurality of projections which are positioned according to firing (igniting) order of the cylinder number. The cam angle sensor 28 detects the projections to produce a cam angle signal representing the cylinder number in the form of the pulses.

As crank and cam angle sensors, an optical sensor can be used in place of the magnetic pickup.

Referring to FIG. 2, the electronic control unit 50 having a microcomputer comprises a CPU (central processing unit) 51, a ROM 52, a RAM 53, a backup RAM 54 and an input/output interface 55, which are connected to each other through a bus line 56. A constant voltage circuit 59 is connected to each element of the control unit 50 for supplying a predetermined constant voltage. Power is applied from a battery 57 to the constant voltage circuit 59 through a contact of a relay 60.

The battery 57 is connected to a coil of the relay 60 through a key switch 61, and to the fuel pump 33 through a contact of a relay 62. Sensors 41, 26, 28, 42, 45, 46, 22 and 43 are connected to an input port of the input/output interface 55. The battery 57 is also connected to the input port for monitoring the voltage of the battery 57. An output port of the I/O interface 55 is connected to the spark plug of the corresponding cylinders through the ignitor 31 and a driver 58 which is connected to the ISCV 16, the injectors 23, the coil of the relay 62, the solenoid valve 21, and the solenoid operated valve 22b.

Control programs and fixed data such as an ignition timing map are stored in the ROM 52. Output signals of the sensors are stored in the RAM 53. The RAM 53 stores the output signals of the sensors after processing data in the CPU 51. The backup RAM 54 is provided to store trouble data. The RAM 54 is backed up by the battery 59 so as to maintain the stored data even if the key switch 61 is in off-states.

The CPU 51 calculates a fuel injection pulse width, an ignition timing and the duty ratio r of the control signal for controlling the solenoid operated valve 21 in accordance with the control programs in the ROM 52 and based on various data in the RAM 53. The corresponding signals are fed to the injectors 23, the ignitors 31 and the solenoid valve 21 for controlling the air-fuel ratio, the ignition timing, and the supercharging pressure by the turbocharger 18, respectively.

The operation for controlling the supercharging pressure will be described with reference to the flowchart of FIG. 3. The flowchart represents a supercharging pressure control routine repeated at predetermined time intervals.

At a step S101, a desired supercharging pressure Ps is derived from a table based on an engine speed NE. An interpolation is executed for the derived pressure, if necessary. The table at the step S101 shows an example of desired supercharging pressures Ps which are relative pressures, assuming that the atmospheric pressure is zero.

Alternatively, the desired supercharging pressure Ps is obtained by calculation with various factors such as an octane number estimated by knocking learning operation and atmospheric pressure correction.

At a step S102, it is determined whether the fuel used in the engine is premium gasoline or regular gasoline from a total correction coefficient TCMP in the ignition timing control. If the premium gasoline is used, the MBT advance angle is large, and hence the total correction coefficient TCMP becomes large. Thus, by comparing the total correction coefficient TCMP with a set value SET, the kind of the gasoline can be detected.

The total correction coefficient TCMP is described in Japanese Patent Application Laid-Open No. 1-294966 submitted by the applicant of the present invention.

If TCMP>SET, it means that the premium gasoline is used. The program goes to a step S104. If TCMP≦SET, it means that the regular gasoline is used. Since the regular gasoline is inferior in antiknock quality to the premium gasoline, it is necessary to correct the desired supercharging pressure Ps. Therefore, the program proceeds to a step S103 where a set value PSET (for example, 0.3) is subtracted from the desired supercharging pressure Ps. Thus, the desired supercharging pressure Ps is set to a corrected value (Ps←Ps−PSET). The program goes to the step S104 from the step S103.

At the step S104, a duty ratio r for the solenoid operated valve 21 is calculated based on the desired supercharging pressure Ps and the pressure P detected by the absolute pressure sensor 22 by an equation as follows.

$$r \leftarrow (Ps - Po)/P \qquad (8)$$

where the Po is a standard supercharging pressure as described hereinbefore.

At a step S105, it is determined whether the calculated duty ratio r is zero or more than zero or not. If yes, the program goes to a step S107 where it is determined whether the duty ratio r is 1.0 or less than 1.0 or not. If yes, the program goes to a step S109. If r>1.0, the program goes to a step S108 where the duty ratio r is set to 1.0 (r←1.0). Thereafter the program goes to the step S109.

If 0>r at the step S105, the program proceeds to a step S106 where the duty ratio r is set to zero (r←0), and the program goes to the step S109.

Namely, at steps S105 to S108, the duty ratio r is set in the range between 0 and 1 ($0 \leq r \leq 1.0$).

At the step S109, the duty ratio r is set and the program terminates. A duty signal in the form of pulses corresponding to the set duty ratio r is applied to the solenoid operated valve 21.

As hereinbefore described, the pressure P in the steady state is represented by the equation (3). If the equation (8) is substituted for the equation (3), the pressure P is represented as follows.

$$P = \{P/(P - Ps + Po)\} \cdot Po$$

$$\therefore P = Ps \qquad (9)$$

Thus, the actual pressure P becomes the desired pressure Ps.

On the other hand, the relationship between the opening area A of the wastegate valve 19 and the pressure P in the transient state is represented as follows.

$$A = (1 - r) Go \cdot P \qquad (10)$$

$$A + \Delta A = (1 - r) Go (P + \Delta P) \qquad (11)$$

If the equation (8) is substituted for the equation (10), $$\begin{aligned} A &= [1 - \{(Ps - Po)/P\}]Go \cdot P \\ &= (P - Ps + Po)Go \end{aligned} \qquad (12)$$

If the equation (8) is substituted for the equation (11), $$\begin{aligned} A + \Delta A &= [1 - \{(Ps - Po)/(P + \Delta P)\}]Go \cdot (P + \Delta P) \\ &= (P + \Delta P - Ps + Po)Go \end{aligned} \qquad (13)$$

If the equation (12) is subtracted from the equation (13), $$\Delta A = Go \cdot \Delta P \qquad (14)$$

From the foregoing, it will be seen that the response in the transient state is the original mechanical response Go irrespective of the desired supercharging pressure Ps.

FIGS. 4a, 4b and 4c show the relationship among the desired pressure Ps, the actual pressure P, the actuator operating pressure Pa, and the opening area A of the wastegate valve.

The actuator pressure Pa is represented by the equation as follows.

$$\begin{aligned} Pa &= (1 - r)P \\ &= \{1 - (Ps - Po)/P\}P \\ &= P - (Ps - Po) \end{aligned}$$

In FIG. 4b, the pressure Ps is set to 2 Po. When the pressure P reaches the pressure Po, the actuator pressure Pa rises. On the other hand, the opening area A of the wastegate valve changes in accordance with the equation (14) irrespective of the duty ratio r. In FIG. 4c, the opening area A shows a relative opening area where the minimum opening area is zero.

In accordance with the present invention, the response and stability can be held constant irrespective of the set value of the desired supercharging pressure Ps. Consequently, good driveability can be provided.

Referring to FIG. 6 showing the flowchart of the second embodiment, the description of the same steps as the first embodiment are omitted.

In the second embodiment, the mechanical response characteristic Go is converted into a set response G1 so that the response is positively changed at every operating range. After the desired supercharging pressure Ps is set in dependency on the kind of the gasoline at steps S102 and S103, the program goes to a step S201 where the throttle valve opening degree TH detected by the throttle position sensor 42 is compared with a set value THo which is, for example, 60 degrees. If TH>THo, the program goes to a step S202 where a supercharging pressure response coefficient k is set to a first set value K1 which is 1.1. The response coefficient k is a ratio of the set value G1 to the mechanical response characteristic Go (G1/Go). Thereafter the program goes to a step S204.

If $TH \leq THo$ at the step S201, the program proceeds to a step S203 where the coefficient k is set to a second set value K2 which is 0.5. The program goes to the step S204.

At the step S204, the duty ratio r is calculated based on the desired supercharging pressure Ps, the actual supercharging pressure P and the standard supercharging pressure Po as follows.

$$r \leftarrow k \cdot Ps/P - (k - 1 + Po/P) \qquad (15)$$

The duty ratio r is set in the same manner as the first embodiment at steps S105 to S109.

Thus, the mechanical response characteristic Go of the turbocharger 18 is converted into the set value G1 in accordance with the equation (15).

In the steady state, the equation (15) is substituted for the equation (3).

$$\begin{aligned} P &= [1/\{-(G1/Go) \cdot (Ps/P) + (G1/Go) + (Po/P)\}] \cdot Po \\ &= [P/\{(-G1/Go)Ps + (G1/Go)P + Po\}] \cdot Po \\ \therefore P &= Ps \end{aligned}$$

The actual supercharging pressure P becomes the desired pressure Ps.

On the other hand, in the transient state, the equation (15) is substituted for the equation (10). The equation (10) is $$\begin{aligned} A &= \{-(G1/Go) \cdot (Ps/P) + (G1/Go) + (Po/P)\}Go \cdot P \\ &= -G1 \cdot Ps + G1 \cdot P + Go \cdot Po \end{aligned} \qquad (17)$$

The equation (15) is substituted for the equation (11). The equation (11) is $$A + \Delta A = [-(G1/Go)\{Ps/(P + \Delta P)\} + \quad (18)$$
$$(G1/Go) + Po/(P + \Delta P)]Go \cdot (P + \Delta P)$$
$$= -G1 \cdot Ps + G1(P + \Delta P) + Go \cdot Po$$

The equation (17) is subtracted from the equation (18).

$$\Delta A = G1 \cdot \Delta P$$

FIGS. 7a, 7b and 7c show the relationship among supercharging pressure, actuator pressure, opening area of wastegate valve corresponding to opening degree of throttle valve of the second embodiment. The desired pressure Ps is 2 Po, and the response coefficient k is 1.1.

If the response coefficient k is 0.5, the duty ratio r is $$r = 1/2 \cdot Ps/P - 1/2 + 1 - Po/P$$
$$= 1/2$$

In the embodiment, the supercharging pressure in the transient state is controlled with a good response during a throttle wide-open state. Furthermore, during a throttle partial-open state, the supercharging pressure is smoothly controlled.

In addition, the supercharging pressure is controlled to a desired pressure. It is possible to set the response and stability of the operation to desired values regardless of the desired supercharging pressure, thereby providing improved driveability.

The present invention is not limited to the above described embodiments. For example, the solenoid operated valve 21 may be modified to be opened to the atmosphere when the duty ratio r is zero. In the modification, the actuator pressure Pa applied to the actuator 20 is Pa=r·P.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method for controlling supercharging pressure in an automotive engine having a turbocharger, a wastegate valve for controlling a flow rate of exhaust gas applied to a turbine of the turbocharger, and an actuator for controlling the wastegate valve, comprising the steps of:
    setting a standard supercharging pressure dependent on characteristics of the wastegate valve;
    setting a desired supercharging pressure in accordance with engine operating conditions;
    calculating a difference between the desired supercharging pressure and the standard supercharging pressure;
    detecting an actual supercharging pressure;
    calculating a ratio of said difference to a detected actual supercharging pressure; and
    calculating a control value applied to the actuator based on said calculated ratio so as to smoothly control said supercharging pressure.

2. The method according to claim 1, wherein
    the actuator is operated by intake air pressure controlled by a solenoid operated valve, the control value is a duty ratio of pulses for operating the solenoid operated valve.

3. A method of controlling supercharging pressure in an automotive engine having a turbocharger, a wastegate valve for controlling flow rate of exhaust gas applied to a turbine of the turbocharger, and an actuator for controlling the waste gate valve, comprising the steps of:
    setting a standard supercharging pressure dependent on characteristics of the wastegate valve;
    setting a desired supercharging pressure in accordance with engine operating conditions;
    calculating a control value applied to the actuator with the following equation, $$k \cdot Ps/P - (k - 1 + Po/P)$$

where k is a supercharging pressure response coefficient, Ps is a desired supercharging pressure, Po is a standard supercharging pressure, and P is an actual supercharging pressure.

* * * * *